United States Patent
Naab et al.

(10) Patent No.: US 9,718,470 B2
(45) Date of Patent: Aug. 1, 2017

(54) DRIVER ASSISTANCE SYSTEM FOR A MOTOR VEHICLE

(75) Inventors: Karl Naab, Woerth (DE); Christoph Mayser, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1634 days.

(21) Appl. No.: 12/025,410

(22) Filed: Feb. 4, 2008

(65) Prior Publication Data

US 2008/0195292 A1    Aug. 14, 2008

Related U.S. Application Data

(63) Continuation of application No. PCT/EP2006/007532, filed on Jul. 29, 2006.

(30) Foreign Application Priority Data

Aug. 5, 2005   (DE) .................. 10 2005 036 924

(51) Int. Cl.
  *B60W 30/18*   (2012.01)
  *B60W 30/16*   (2012.01)
  *B60W 30/188*   (2012.01)
  *B60W 40/107*   (2012.01)

(52) U.S. Cl.
  CPC .......... *B60W 30/16* (2013.01); *B60W 30/188* (2013.01); *B60W 40/107* (2013.01); *B60W 2720/106* (2013.01)

(58) Field of Classification Search
  USPC ............. 701/1, 2, 4, 5, 8–10, 19–22, 36, 48, 701/50–60, 65–72, 78, 79, 82–99, 701/101–105, 110
  See application file for complete search history.

(56) References Cited

U.S. PATENT DOCUMENTS

| | | | | |
|---|---|---|---|---|
| 4,964,051 A | * | 10/1990 | Sekozawa | F02D 11/10 123/492 |
| 5,123,301 A | * | 6/1992 | Hagele | F16H 61/0213 477/121 |
| 5,508,923 A | * | 4/1996 | Ibamoto | B60K 31/047 701/58 |
| 5,663,880 A | * | 9/1997 | Saur | B60K 31/047 701/93 |

(Continued)

FOREIGN PATENT DOCUMENTS

| | | |
|---|---|---|
| DE | 35 23 352 C2 | 1/1986 |
| DE | 39 19 108 C2 | 12/1990 |

(Continued)

OTHER PUBLICATIONS

International Search Report dated Jan. 16, 2007 with English translation (Four (4) pages).

(Continued)

*Primary Examiner* — Jonathan M Dager
(74) *Attorney, Agent, or Firm* — Crowell & Moring LLP

(57) ABSTRACT

A driver assistance system for a motor vehicle has a controller within a speed and/or distance regulator, which controller is used for the regulation of the acceleration of the motor vehicle according to a setpoint acceleration. The driver assistance system also includes an input coupling unit for coupling an additional acceleration that can be predefined by the driver of the motor vehicle into the system.

13 Claims, 2 Drawing Sheets

(56) References Cited

U.S. PATENT DOCUMENTS

| | | | | |
|---|---|---|---|---|
| 5,774,820 A * | 6/1998 | Linden | B60K 31/047 | 180/179 |
| 5,832,399 A * | 11/1998 | Seichter | F16H 61/061 | 701/51 |
| 5,901,806 A * | 5/1999 | Takahashi | B60K 31/0008 | 180/167 |
| 6,282,482 B1 * | 8/2001 | Hedstrom | B60K 31/042 | 701/70 |
| 6,311,121 B1 * | 10/2001 | Kuragaki | B60K 31/0008 | 180/167 |
| 6,459,983 B1 * | 10/2002 | Lichtenberg | B60K 31/0008 | 180/169 |
| 6,615,127 B2 | 9/2003 | Hellmann et al. | | |
| 7,266,453 B2 | 9/2007 | Sawamoto et al. | | |
| 2001/0021891 A1 * | 9/2001 | Kusafuka | F16H 61/0213 | 701/57 |
| 2002/0069009 A1 * | 6/2002 | Hellmann | B60K 31/0008 | 701/95 |
| 2002/0165655 A1 * | 11/2002 | Hellmann | B60K 31/042 | 701/93 |
| 2003/0093210 A1 * | 5/2003 | Kondo | B60G 17/0195 | 701/96 |
| 2003/0109979 A1 * | 6/2003 | Schuster | B60K 31/04 | 701/70 |
| 2003/0200016 A1 * | 10/2003 | Spillane | B60G 17/0195 | 701/36 |
| 2004/0002803 A1 * | 1/2004 | Lee | F16H 61/0213 | 701/59 |
| 2004/0040765 A1 * | 3/2004 | Satou | B60K 31/04 | 180/170 |
| 2004/0249533 A1 * | 12/2004 | Wheals | B60T 8/172 | 701/36 |
| 2005/0004742 A1 * | 1/2005 | Michi | B60K 31/0008 | 701/93 |
| 2005/0154506 A1 * | 7/2005 | Takamatsu | B60W 40/10 | 701/1 |
| 2005/0203684 A1 * | 9/2005 | Borgesson | B60K 35/00 | 701/36 |
| 2005/0256627 A1 * | 11/2005 | Sah | B60T 7/12 | 701/70 |
| 2006/0015239 A1 * | 1/2006 | Higuchi | B60T 7/12 | 701/72 |
| 2006/0173601 A1 * | 8/2006 | Bassiere | B60G 17/0195 | 701/53 |
| 2006/0229792 A1 * | 10/2006 | Kawazoe | B60W 30/16 | 701/93 |
| 2008/0190681 A1 * | 8/2008 | Mayser | B62D 1/046 | 180/170 |
| 2010/0185375 A1 * | 7/2010 | Hanzawa | B60T 8/174 | 701/70 |
| 2010/0211254 A1 * | 8/2010 | Kimura | F02D 29/02 | 701/31.4 |
| 2010/0332096 A1 * | 12/2010 | Hanzawa | B60K 31/047 | 701/70 |
| 2011/0214526 A1 * | 9/2011 | Demma | B60K 26/021 | 74/560 |

FOREIGN PATENT DOCUMENTS

| | | |
|---|---|---|
| DE | 44 43 219 C1 | 5/1996 |
| DE | 196 40 694 A1 | 4/1998 |
| DE | 196 54 769 A1 | 7/1998 |
| DE | 199 43 332 A1 | 3/2001 |
| DE | 100 19 190 A1 | 10/2001 |
| DE | 103 03 611 A1 | 8/2004 |
| DE | 10 2004 040 532 A1 | 3/2005 |
| DE | 103 43 178 A1 | 4/2005 |

OTHER PUBLICATIONS

German Search Report dated Apr. 3, 2006 with English Translation (Nine (9) pages).

* cited by examiner

DRIVER ASSISTANCE SYSTEM FOR A MOTOR VEHICLE

CROSS-REFERENCE TO RELATED APPLICATIONS

This application is a continuation of PCT International Application No. PCT/EP2006/007532, filed on Jul. 29, 2006, which claims priority under 35 U.S.C. §119 to German Application No. 10 2005 036 924.3, filed Aug. 5, 2005, the entire disclosures of which are expressly incorporated by reference herein.

BACKGROUND AND SUMMARY OF THE INVENTION

The invention relates to a driver assistance system for a motor vehicle having a controller for the regulation of the acceleration of the motor vehicle according to a setpoint acceleration.

In general, driver assistance systems for longitudinal guidance of a vehicle can be implemented for a number of different spheres of action. Thus, for example, informational and/or warning distance-information systems indicate in an acoustical, optical or haptical manner to the driver that the distance of the motor vehicle from a preceding vehicle is too short. Then, the driver can decide whether and how he can correct, as a function of the situation, his driving speed and the momentary distance. Assistance systems, which make semi-automatic recommendations, use, for example, a so-called active gas pedal, which immediately informs the driver about the momentary "correct" gas pedal position by means of artificial additional forces in the gas pedal. The gas pedal position is necessary for maintaining the adapted speed or the correct distance from a preceding vehicle. The driver himself decides how he wants to translate the information regarding the correcting value that is proposed directly by the system. Automatic distance control systems, such as an ACC system, endeavor to assume the entire longitudinal guidance for specific driving situations.

The driving speed control system or the ACC system usually enables the driver to set the desired speed at the steering wheel using an operator control element, for example a pitman arm or push buttons. Then, the system controls the speed, if desired, as a function of the temporal distance from a vehicle traveling ahead.

Then, the driver can change the desired speed with the pitman arm and/or the push buttons, or can deactivate the system with these operator control elements. Furthermore, it is usually possible for the driver to override (equals higher speed) the system by using the gas pedal. As a result, the control system ceases temporarily to have an effect; and the system is deactivated with the brake pedal. According to this prior art system philosophy, the driver can either rely on the system and let the system drive, in which case certain specifications can be made, as described above; or the driver can turn off the system and do the driving himself. If the driver lets the system drive, he becomes an observer/monitor of the system and can indirectly influence the system, but he is not actively involved in the control process (maintaining speed and distance). When the system reaches one of its limits, the step demands that the driver assumes the active control again—a role change. Many drivers find this role change to be inconvenient and, hence, it is delayed as long as possible.

According to the current and foreseeable future of the state of the art that can be expected, it is not possible to transfer the entire longitudinal guidance of the vehicle to the driver assistance system. There are still a number of driving situations, with which the automatic distance control system cannot cope or can cope only to an inadequate extent in practical traveling situations. Important factors are, on the one hand, the limited detection capacity of the conventional modern driving environment sensing systems. However, on the other hand, the decisive factor is of a generic nature. From the perspective of the overall task of driving, the ACC fully automates to some degree individual tasks within the total longitudinal guidance task, which interferes to a considerable extent with the remaining operating and control activities of the driver. The driver must interact with the automatic system. In the case of ACC, this system is programmed in essence only with respect to maintaining the distance or—during unobstructed travel—with respect to maintaining a desired speed. However, driving a car is a dynamic process, during which it is usually not possible to maintain absolutely constant time gaps or fixed desired speeds, but rather deviations from these simple rules of the ACC system occur at a significant frequency. As a result, a plethora of conflicts with the driver's expectations or a typical behavior of the driver are preprogrammed.

Some examples are vehicles cutting in front of the vehicle, vehicles turning off, sensor coverage ranges that are too short, late reaction to a fast approaching vehicle, imprecise/uncertain lane allocation, lane change, limited deceleration capacity, no reaction to objects that are standing still, misinterpretation of apparently relevant objects, non-detection of relevant objects, etc.

In these cases, as stated above, the driver has the choice in the modern functional and operating designs of the ACC of either turning off the system or taking over the control himself by depressing the OFF button. Or, if some other deceleration than that initiated by the system is necessary, the driver can turn it off at the same time that he operates the brake pedal. In order to generate an acceleration that is higher than that specified by the system, the driver has to operate the gas pedal. In this case, the system function recedes briefly into the background and is re-activated when the gas pedal is released. In both cases, an interruption in the natural dynamic flow of travel is produced with the disengagement. Re-engagement, which often follows a short time after the disengagement, usually brings about a clearly perceptible transient effect. Furthermore, in both cases the intervention also involves an excessive manual operating effort.

In order to achieve better acceptance and a more harmonic interaction between the driver and the semi-automated system, it is, therefore, advised to provide measures that enable better involvement of the driver in order to improve the method for informing the system, on the one hand, of the driver's diverging assessment of the driving situation and, on the other hand, in particular, his intentions, so that the entire driving process is more homogeneous.

To this end, German patent document DE 103 03 611 A1 describes a speed controller with a plurality of operating modes, where a "stop and go mode" is provided as one operating mode; and an ACC mode is provided as a second operating mode. In these two modes, it is possible for the driver to operate the gas pedal and, thus, override the stop and go control function and/or the ACC control function. Therefore, during override, these functions are deactivated and are resumed following the override.

Furthermore, German patent document DE 10 2004 040 532 A1 discloses a vehicle object detection system, a preceding vehicle following control system, and a vehicle control system, which exhibits an acceleration/deceleration request detector for sensing an occupant's request for an acceleration or deceleration on the basis of the actuation of the brake pedal by the occupant, the actuation of a gas pedal by the occupant, an actuation of a switch by the occupant, and/or a voice of the occupant. On the basis of the sensed acceleration/deceleration request, a coverage range of the sensor that is used for the ACC system is changed. In particular, upon a request for a deceleration, the coverage range is increased laterally, if the occupant's request for a deceleration is sensed so that vehicles, cutting in from the side in front of the vehicle to be controlled, are detected earlier, and the system automatically adjusts itself to those vehicles. In contrast, the coverage range is decreased laterally, if the acceleration/deceleration detector senses a request for an acceleration, thus preventing an unnecessary execution of a vehicle control on the basis of the vehicles cutting in from the side.

German patent document DE 103 43 178 A1 discloses a driver assistance system with variable longitudinal guidance strategies. This system exhibits a strategy module for the variable determination of the longitudinal guidance system to be applied. In this case, there are a variety of different longitudinal guidance strategies, such as "comfort emphasized," "normal" or "dynamic," which are or can be stored beforehand. The driver can select one of these strategies before starting the trip and, if necessary, also during the trip. Basically the strategies differ in their different positive/negative acceleration characteristics.

German patent document DE 196 40 694 A1 describes a method and a device for controlling the driving speed of a vehicle. In this case, the limit of the speed change of the vehicle, as a function of the driver's desired dynamic characteristic of the vehicle, in particular as a function of the shift state of at least one driver-operable operator control element, is suspended or set to higher values. In this case, the acceleration and/or the deceleration dynamics of a driving speed control system are designed so as to be adjustable. Therefore, since the driver sets the acceleration and/or deceleration dynamics, he is tied into the system. Since in this case the limit values of the maximum acceleration and/or deceleration that is set by the system are changed, the effect of the intervention becomes clear only when the automatic speed control system executes an acceleration, acceleration change, deceleration and/or a deceleration change that exceeds the old limit values.

Moreover, German patent document DE 100 19 190 A1 discloses a method for the adaptive control of the separation distance and/or driving speed of a motor vehicle. In this case, the magnitude representing the setpoint acceleration is formed and/or limited at least as a function of at least one base value; and external and internal acceleration requests can be converted by way of respectively defined of base values. In particular, for comfort and safety reasons, the vehicle acceleration ought not to be changed in arbitrary jumps, but rather the jolt, which is defined as a temporal change in acceleration, is limited by limit values in the positive and negative direction. Then a new setpoint acceleration is determined by way of a minimum base value, a maximum base value, the limit values, and the past setpoint acceleration. The maximum base value is that value that must exceed at least a setpoint acceleration defined by the ACC controller, so that a positive acceleration change of the vehicle ensues. The minimum base value is that value that must fall below at least a setpoint acceleration that is defined by the ACC controller, so that a negative acceleration change of the vehicle ensues. During active control, the minimum base value and the maximum base value are formed from a current base value and the last setpoint value. During all transitions into the drive case or the active control mode, the minimum base value and the maximum base value are initialized to the current base value. During control with brake intervention, the minimum base value and the maximum base value are formed from base values, provided by a deceleration controller and/or an active brake, and the last setpoint value. When the setpoint value is below the minimum acceleration of the drive, but the brake intervention has not yet been activated, the maximum base value is formed by way of a minimum acceleration value; and the minimum base value is formed by way of a minimum acceleration value, decreased by a brake engagement hysteresis value. If the driver of the motor vehicle requests a higher engine output than the ACC system demands (driver override), the maximum base value is set as the current base value; and the minimum base value is set as a value $a_{DrvMin}$ that is not closely defined.

The common feature of all of these systems is that the driver is always confronted with the decision of whether he would like to let the system drive or whether he himself would like to drive. Only in an indirect manner is it possible to intervene in the system, which the intervention does not disengage—at least temporarily. For this reason, critical situations cannot be adequately avoided by decelerating or accelerating while simultaneously maintaining the active control.

Accordingly, the invention provides an improved driver assistance system for a vehicle having a controller for the control of the acceleration of the vehicle according to a setpoint acceleration value.

According to the invention, a driver assistance system for a vehicle with a controller for the control of the acceleration of the vehicle according to a setpoint acceleration is provided, which has an input coupling unit for coupling an additional acceleration that can be predefined by the driver of the vehicle.

Accordingly, the invention provides for intervention in the driver assistance system, carefully incorporated possibilities in the natural and intuitive actions and reactions of the driver. By using an input coupling unit for the input of the additional acceleration that can be predefined by the driver of the vehicle, the driver is enabled, by virtue of the superimposed control, to feed additional acceleration requirements into the speed control system. With this regulation concept, the requirements of the driver and the requirements of the system are processed to obtain a total acceleration and integrated in the control. Due to this procedure, the operating mode changes, so that the driver now drives in association with the system. As a result, the driver need not switch off the system so frequently. The driver can override the system in certain situations (through the additional acceleration demands) without switching it off. As soon as the driving situation is handled, then the driver withdraws (ends his additional demand) and the system takes over again the complete control automatically. The driver thus actively participates in the process of control and is thus "in the loop."

Hence, according to the invention, the degree of automation, for example, the ACC function, is reduced in such a manner that the driver can modify the setpoint acceleration or the setpoint retardation (=negative setpoint acceleration) of the vehicle specified by the ACC control by use of a suitable operator control element such that with it, the driving as desired by him (desired acceleration and deceleration) that deviates that by the ACC system, which is possibly based on his assessment of the driving situation that deviates from that of the ACC system, can inform the acceleration controller provided in the ACC system without leading to an interruption of the ACC function.

An adjustment mechanism of that type for the superimposition of the driver input on a setpoint acceleration or a setpoint deceleration, deviating from that of the system input, can be present as a manually operated element with a defined null position and a continuously accessible positive and a negative adjustment range. This operating element is, preferably, arranged within the accessible reach of the driver, for example in the vicinity of the gear selection stick, in a multifunction steering wheel, in the form of a steering control arm, etc. The operating element is preferably selected in a manner consistent with the driver expectations, so that intuitive driver reactions for accelerations and retardation are enabled as far as possible, for example in case of a horizontal arrangement of the operating element, the following operating mechanisms can be suitable: forward=increase system acceleration, backward=decrease system acceleration.

Due to these values generated by the driver by way of the operating element, the setpoint acceleration generated by the system is modified so that the effect of the system is continuously weakened and the effect of the driver operation is strengthened. The characteristics of the controlling engagement of the operating element can be designed arbitrarily, with a linear, progressive, degressive, symmetrical, asymmetrical and/or with a characteristic time response, in order to fulfill the requirements related to scalability, vehicle reaction, dynamic experience, optimal driver-vehicle control loop performance, etc.

Further, this problem is solved according to invention with a method for the control of the acceleration of the vehicle according to the setpoint acceleration by using a controller, in which an integration of the additional acceleration that can be prespecified by the driver of the vehicle manually takes place.

According to the invention, preferably, an additional acceleration is superimposed on the system acceleration so as to generate the setpoint acceleration. For that, the regulator of the driver assistance system according to the invention preferably includes an acceleration controller, which receives the setpoint acceleration, whereby the input coupling unit, which generates the setpoint acceleration through superimposition of the additional acceleration on the system acceleration, is arranged upstream before the acceleration controller.

According to the invention, preferably a compensation for a disturbance variable takes place, which acts on the setpoint acceleration. For that, the acceleration controller of the driver assistance system according to the invention preferably includes a disturbance variable monitor, which acts on the setpoint acceleration.

According to the invention, the system acceleration is preferably generated by the speed controller. For that, the controller of the driver assistance system according to the invention preferably includes a speed controller, which outputs the system acceleration, whereby the input coupling unit is arranged downstream after the speed controller and the setpoint acceleration is generated through the superimposition of the additional acceleration on the system acceleration.

According to the invention, the superimposition of the additional acceleration on the system acceleration takes place preferably through addition of the additional acceleration to the system acceleration, that is, in the driver assistance system according to the invention, the input coupling unit is preferably a summing unit.

With these embodiments according to the invention, the manual superimposition of an acceleration to a system acceleration has the effect similar to an acceleration disturbance in a closed control loop. The coupling of the manually provided additional acceleration does not takes place within the disturbance variable monitor feedback, in order not to compensate the manually provided additional acceleration by the disturbance variable monitor. The speed controller and a distance controller, possibly arranged upstream before it, have preferably no such integral components that act on the respective difference variable difference, in order that the effect of the manually provided additional acceleration is not offset as a result of it.

With this arrangement of the acceleration operation according to the invention, driving situations, such as, for instance, with a near cut-in of a vehicle, can be handled without the actuation of the brakes and thus without deactivation of the assistance system.

Other objects, advantages and novel features of the present invention will become apparent from the following detailed description of the invention when considered in conjunction with the accompanying drawings.

DETAILED DESCRIPTION OF THE DRAWINGS

Figure 1:
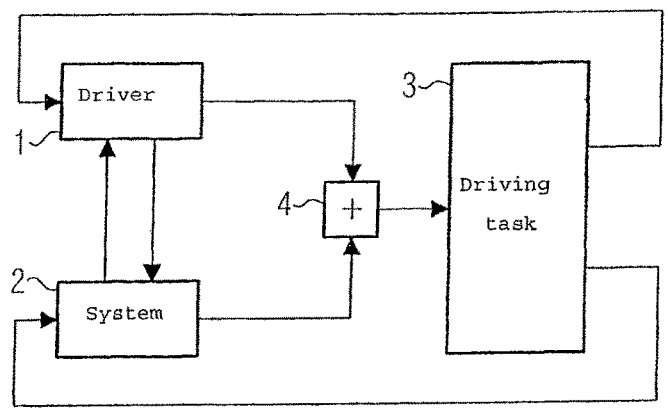
FIG. 1 is a block diagram illustrating an interaction scheme of the driver with the vehicle and the assistance system according to the invention.

FIG. 1 shows a schema of the interaction of the driver 1 with the vehicle and the assistance system 2, for example by use of an acceleration operation element, based on a preferred embodiment of the invention. In particular, one can recognize clearly that the driver 1, integrated with the system 2, solves a driving task 3 jointly with the system 2 as an equal participant. For that, a control signal output by the system 2 is superimposed with a control signal output by the driver 1. This superimposition takes place by means of a summing unit 4, which generates the total control signal, which then acts on the driver task 3. From this follows the respective feedback to the driver 1 and the system 2.

Thus, the driver assistance system according to the invention does not involve a separate regulation of the driving task by the system 2, on one side, and by the driver 1, on the other side, in which one control loop built by the system 2 and one control loop built by the driver 1, respectively act alternately to solve the driving task 3. Rather, the driver assistance system has a joint control through the addition of the respective control signals and feeding of the superimposed control signals to the driving task 3 to tackle the driving task 3. Hence, according to the invention, the driver 1 is integrated in the driver assistance system 2 (or the driver assistance system 2 in the control taking place by the driver 1).

Figure 2:
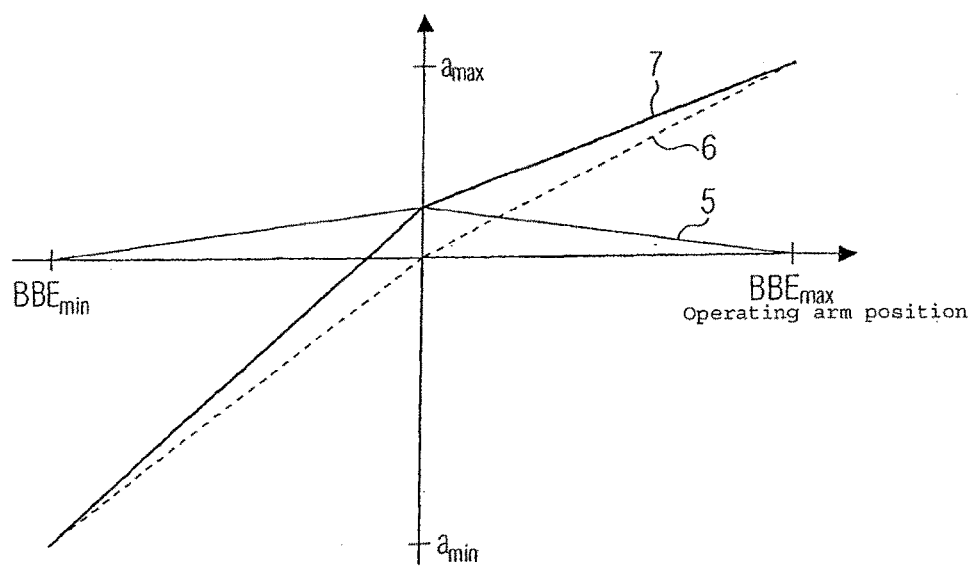
FIG. 2 is a graph illustrating the effect of driver input in the operation of the acceleration according to a first advantageous embodiment of the invention.

FIG. 2 shows an example of the superimposition characteristic, as it can appear through the superimposition. Here the abscissa represents the position of the operating arm and the ordinate the acceleration. Plotted in this coordinate system are a system setpoint acceleration part 5, an operating arm setpoint acceleration part 6, and the resultant setpoint acceleration 7. The current system-prespecified maximum and minimum values of the setpoint acceleration 5 can vary from situation to situation, however one can clearly recognize that the system setpoint acceleration 5 declines linearly with the displacement of the operating arm in positive or negative direction and for maximum displacement of the operating arm in the positive or the negative direction, it declines to 0. The operating arm setpoint acceleration part 6 is drawn here as a straight line passing through the origin of the coordinate system, however other arbitrary functions can be selected, which need not pass through the origin of the coordinate system. In the latter case, one obtains the additional acceleration "predefined by the driver" at the null point of the operating arm.

The resultant setpoint acceleration 7 is obtained as the addition of the system setpoint acceleration 5 and the operating arm setpoint acceleration 6.

The characteristics of the controlling engagement actuated by the operating arm can be arbitrarily linear, progressive, degressive, symmetrical, asymmetrical and/or have a characteristic time response, with which different requirements in regard to scalability, vehicle reaction, experience of the dynamics, optimal driver-vehicle control loop performance etc. are fulfilled. Furthermore, the system setpoint acceleration 5 cannot be reduced linearly or cannot be reduced up to null with the displacement of the operating arm.

Figure 3:
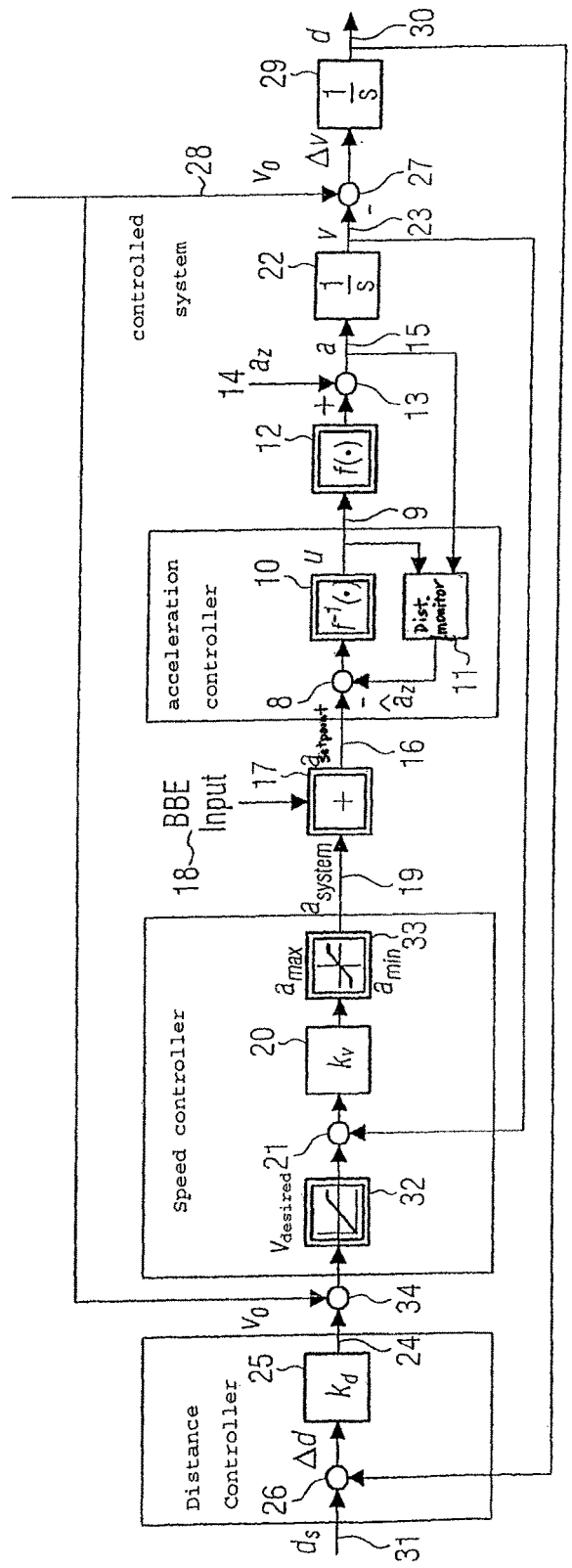
FIG. 3 is a block diagram of a possible implementation of a manual operation of the acceleration in an ACC and/or speed control structure according to a preferred embodiment of the invention.

FIG. 3 shows an implementation of a manual actuation of the acceleration in an ACC and/or a speed control structure according to one of the preferred embodiments of the invention. The core of this controller is an acceleration regulator with a control unit 10 with inverse vehicle model $f^{-1}(\cdot)$ and a disturbance variable monitor 11. With this acceleration regulator, a control variable value u, that is, a signal for providing fuel/braking, is output to the vehicle. The vehicle itself is represented in FIG. 3 as a "controlled system" by a static vehicle model $f(\cdot)$ 12, a summing unit 13 switched in downstream after it, by which a disturbance acceleration $a_z$ is coupled, a first differentiator unit 22 receiving the acceleration a output by the latter, which differentiator unit outputs the driving speed v of the vehicle, a subtraction unit 27, which subtracts the vehicle speed v from the speed $v_0$ of the preceding vehicle and outputs the speed difference $\Delta v$, and a second differentiator unit 29, which receives the speed difference $\Delta v$ and outputs the distance d between the vehicle and the vehicle traveling before it.

The disturbance variable monitor 11 receives the control variable value u and the vehicle acceleration a and calculates from it an error signal $\hat{a}_z$, which is fed to the subtraction unit 8, which subtracts this error signal $\hat{a}_z$ from the vehicle set point acceleration $a_{setpoint}$ also fed to this subtraction unit 8, and gives the resulting signal to the control element 10 with the inverse static vehicle model $f^{-1}(\cdot)$, from which then the control variable value u is output.

The setpoint acceleration $a_{setpoint}$ is obtained through superimposition of the manual additional acceleration 18 on the acceleration signal $a_{system}$ output by the speed controller through the summing unit 17. The speed controller includes a summing unit 21, which adds a negative desired speed $v_{desired}$ to a negative setpoint speed $v_{setpoint}$, which is output by the distance regulator, or—in case there is no distance regulator, but only a speed controller (Tempomat)—to the vehicle speed v generated by the controlled system (that is, the vehicle) and thus outputs a difference speed $\Delta v_{setpoint}$, which is converted to the system acceleration $a_{system}$ using the amplification factor for the speed error $k_v$, that is, by means of a proportional element 20, and a comfort and safety limiter 33 for the setpoint acceleration arranged downstream after it, which limiter sets the upper and lower bounds for the setpoint acceleration output by the proportional element 20.

In the case of an ACC control structure, that is, in the case that a distance regulator is provided, the latter receives a setpoint distance $d_s$, which is deducted from the distance d to the preceding vehicle by way of a subtraction unit 26, so as generate a (negative) distance error $\Delta d$, which is amplified in a proportional element 25 by an amplification factor for the distance error $v_d$, in order to obtain the setpoint speed $v_{setpoint}$ by the addition of the thus obtained difference speed to the speed $v_0$ of the preceding vehicle by way of a summing unit 34. For the setpoint speed $v_{setpoint}$ thus obtained, a desired speed limiter 32 is provided within the speed controller at its input, upstream before the summing unit 21, which desired speed limiter limits the setpoint speed $v_{setpoint}$ output by the distance regulator to the maximum desired speed set by the driver.

Based on the possible implementations shown in FIG. 3 of the manual actuation of the acceleration in an ACC and/or a speed controller structure, one can see that for the system acceleration, the manual superimposition of an acceleration according to the invention has the effect akin to a disturbance acceleration in a closed control loop. In order not to compensate the effect of manual actuation of the additional acceleration by the disturbance variable monitor 11, one must note that the coupling of the manually operated additional acceleration does not take place within the feedback from the disturbance variable monitor. One must also note that the speed controller, and possibly the distance controller, do not have integral components having an effect on the respective controlled difference values, because these too would offset the effect of the manual additional acceleration.

For achieving more comfort, the previously described acceleration operator control element (BBE) can also be enhanced with effect on the DME and the brake manipulations. Further, an extension of the operating element on the accelerator pedal and the brake of the vehicle is also possible.

With the arrangement according to the invention for the actuation of the acceleration, the driving situations, such as, for instance, when a vehicle cuts-in front too closely, can be handled without actuation of the brakes and hence without deactivation of the assistance system.

Other possible functions related to the coupling, according to the invention, of the additional acceleration that can be predefined by the driver of the vehicle are:
  Halting by means of the acceleration operating element without regulation in connection with a preceding vehicle and combination with standstill management;
  Startup for drive-away using the acceleration operating element without regulation in connection with a preceding vehicle, with a significant actuation in the direction of the acceleration;
  Corrected halting with regulation in connection with a preceding vehicle in combination with a Stop+Go function of the ACC system;
  Controlled opening during the halting process with regulation in connection with a preceding vehicle in combination with the Stop+Go function of the ACC system; and Startup command with regulation in connection with a preceding vehicle in combination with the Stop+Go function of the ACC system with a significant actuation in the direction of the acceleration.

An actuation for the acceleration according to the invention in the form shown by way of example in FIG. 3 is not exclusively linked with the presence of a distance controller system such as an ACC system. The following variants are possible:

A) The acceleration system according to the invention can—as described previously—be integrated completely consistently also in a driving speed controller with pre-selectable desired speed ($V_{desired}$). The advantages of a decrease or an increase in the driving speed for a short period by use of the acceleration operating element for the driver are just as evident as in the case of ACC control.

B) Also in driving speed controllers without a preselectable desired speed, the actuation of the acceleration according to the invention can be completely consistently integrated: in case of manual pre-specification of a positive acceleration using the acceleration operating element, the vehicle accelerates according to the prespecified value, on releasing the acceleration operating element (and the automatic reset to a neutral position connected with it), the vehicle retains the momentary speed as long as the driving speed control is active. In case of manual predefinition of a negative acceleration by the acceleration operating element, the vehicle decelerates according to the predefined value, on releasing the acceleration operating element (and the automatic reset to the neutral position connected with it), the vehicle retains the momentary speed, as long as the driving speed control is active. If the vehicle comes to a standstill during a manual predefinition of a negative acceleration through the acceleration operating element, the standstill management becomes active. Startup and increasing acceleration of the vehicle, for example through the actuation of the acceleration operating element in the direction "accelerate," can also be consistently implemented.

This variant is then comparable with a conventional operation of a driving speed control, in which, for example, an acceleration is initiated through continuous pressing of a "+" button, and a deceleration through continuous pressing of a "−" button. The essential difference compared to such a conventional operational layout lies, however, in the scalability of the respective acceleration or the deceleration, the possible range of operation in the entire speed range, including standstill, and the described standstill and startup functions.

C) Acceleration operation can also be used without regulation of the driving speed, for example, as a manual acceleration or actuation of the brake. The operation of the brake can thereby be designed including up to the emergency brake. The advantages can lie in the significantly faster vehicle reaction due to the lower actuation periods, for example, due to the lower mass of the person's thumb involved in the actuation of the acceleration operating element compared to the relatively large mass of a person's leg with the footwear involved in the actuation of the operating brake. This can save, particularly in situations requiring emergency braking, several valuable meters of braking distance, in particular since the acceleration operating element can be designed for reaching the "catch" quicker than what is the case with the operating brakes, which must then in such an event be stepped on "with full force."

Table of Reference Numbers

1 Driver
2 System
3 Driving task
4 Summing unit
5 System acceleration
6 Additional acceleration predefinable by the driver of the vehicle
7 Resultant setpoint acceleration
8 Subtraction unit
9 Control variable value u for the vehicle
10 Control element with inverse static vehicle model $f^{-1}(.)$
11 Disturbance monitor
12 Reproduction of the static vehicle model $f(.)$
13 Summing unit for reproduction of the vehicle control loop
14 Disturbance acceleration $a_z$
15 Acceleration of the vehicle a
16 Setpoint acceleration $a_{setpoint}$ for the acceleration controller
17 Summing unit for superimposition of additional acceleration on the system acceleration
18 Additional acceleration manually operated by the driver
19 System acceleration $a_{system}$ outputted by the speed controller
20 P control element of the speed controller
21 Summing unit of the speed controller
22 First differentiator for reproduction of the vehicle as a control loop
23 Vehicle speed v
24 Setpoint speed $v_{setpoint}$ outputted by the distance controller or desired speed $v_{desired}$ inputted to the driving speed controller
25 P control element of the distance controller
26 Subtraction unit of the distance controller
27 Subtraction unit for the reproduction of the vehicle as a control loop
28 Speed of the preceding vehicle $v_0$
29 Second differentiator for the reproduction of the vehicle as a control loop
30 Distance from the preceding vehicle d
31 Setpoint distance to the preceding vehicle $d_s$
32 Desired speed limiter
33 Comfort and safety limiter
34 Summing unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system for a motor vehicle, comprising:
a controller configured to control an acceleration of the motor vehicle according to a setpoint acceleration; and
an input coupling unit configured to couple a driver-generated increment of additional acceleration predefinable by the driver of the vehicle prior to an acceleration event into the driver assistance system,
wherein
the controller comprises an acceleration controller, which receives the setpoint acceleration; and
the input coupling unit is operatively configured upstream of the acceleration controller and generates, in response to operation of an operating element by the driver during the acceleration event, the setpoint acceleration by superimposing at least a portion of the predefined increment of additional acceleration on a system acceleration of the driver assistance system, the portion of the predefined increment of additional acceleration coupled into the driver assistance system being proportional to an amount of actuation of the operating element by the driver during the acceleration event.

2. The driver assistance system according to claim 1, wherein the acceleration controller comprises a disturbance monitor operatively configured to effect the setpoint acceleration.

3. The driver assistance system according to claim 1, wherein the controller comprises a speed controller, which outputs a system acceleration; and
wherein the input coupling unit is arranged downstream of the speed controller and is configured to generate the setpoint acceleration by superimposing the additional acceleration predefinable by the driver of the vehicle on the system acceleration.

4. The driver assistance system according to claim 1, wherein the controller further comprises a speed controller configured to output the system acceleration, and wherein the input coupling unit is operatively arranged downstream of the speed controller.

5. The driver assistance system according to claim 2, wherein the controller further comprises a speed controller configured to output the system acceleration, and wherein the input coupling unit is operatively arranged downstream of the speed controller.

6. The driver assistance system according to claim 1, wherein the input coupling unit is a summing unit.

7. The driver assistance system according to claim 3, wherein the input coupling unit is a summing unit.

8. A method for controlling an acceleration of a motor vehicle, the method comprising the acts of:
predefining by driver operation of an operating element of the vehicle a driver-generated increment of additional acceleration prior to an acceleration event;
generating a setpoint acceleration by way of the controller of a driver assistance system of the motor vehicle; and
during the acceleration event coupling into the driver assistance system a at least a portion of the predefined increment of additional acceleration, the portion of the predefined increment of additional acceleration coupled into the driver assistance system being proportional to an amount of actuation of the operating element by the driver,
wherein the generating of the setpoint acceleration during the acceleration event further comprises the act of superimposing the predefined increment of additional acceleration on a system acceleration generated by the driver assistance system of the motor vehicle.

9. The method according to claim 8, wherein the system acceleration is generated by a speed controller of the driver assistance system.

10. The method according to claim 8, further comprising the act of compensating for a disturbance variable affecting the motor vehicle, said compensation having an effect on the setpoint acceleration.

11. The method according to claim 9, further comprising the act of compensating for a disturbance variable affecting the motor vehicle, said compensation having an effect on the setpoint acceleration.

12. The method according to claim 8, wherein the act of superimposing comprises the act of adding the manual additional acceleration to the system acceleration in order to generate the setpoint acceleration.

13. The method according to claim 11, wherein the act of superimposing comprises the act of adding the manual additional acceleration to the system acceleration in order to generate the setpoint acceleration.

* * * * *